United States Patent [19]

Taylor et al.

[11] 4,037,392
[45] July 26, 1977

[54] TOBACCO HARVESTER

[76] Inventors: Miller Taylor; Jimmy N. Taylor; Oren M. Taylor; George R. Taylor, all of Highway 701 South, Elizabethtown, N.C. 28337

[21] Appl. No.: 652,676

[22] Filed: Jan. 27, 1976

[51] Int. Cl.² .......................................... A01D 45/16
[52] U.S. Cl. ...................................................... 56/27.5
[58] Field of Search ............... 56/27.5, 327 R; 171/28

[56] References Cited

U.S. PATENT DOCUMENTS

| | | | |
|---|---|---|---|
| 189,568 | 4/1877 | Maull | 171/28 |
| 2,693,070 | 11/1954 | Gaut et al. | 56/27.5 |
| 3,178,873 | 4/1965 | Meyer | 56/27.5 |
| 3,393,501 | 7/1968 | Meyer | 56/327 R |
| 3,511,038 | 5/1970 | Gates | 56/327 R |
| 3,902,607 | 9/1975 | Middleton | 56/27.5 X |

*Primary Examiner*—Russell R. Kinsey
*Attorney, Agent, or Firm*—Sughrue, Rothwell, Mion, Zinn and Macpeak

[57] ABSTRACT

The tobacco harvester is adapted to be mounted adjacent the side of a tractor and includes an inclined chute with a chain conveyor operating in an aperture in the bottom of the chute extending the full length of the chute. The lower end of the inclined chute straddles the tobacco plant and a rotating cutter blade mounted at the lower end of the chute severs the stalk close to the ground. The cut tobacco plant travels top first up the conveyor and at the top end of the chute the top of the stalk passes through an aperture formed by orthogonally disposed stationary bars and into the nip between a pair of rotatable feed rollers, one of which is driven. The feed rollers draw the stalk through the stripper bars to strip the leaves from the stalk so that the stalk and the leaves will fall into separate containers.

7 Claims, 6 Drawing Figures

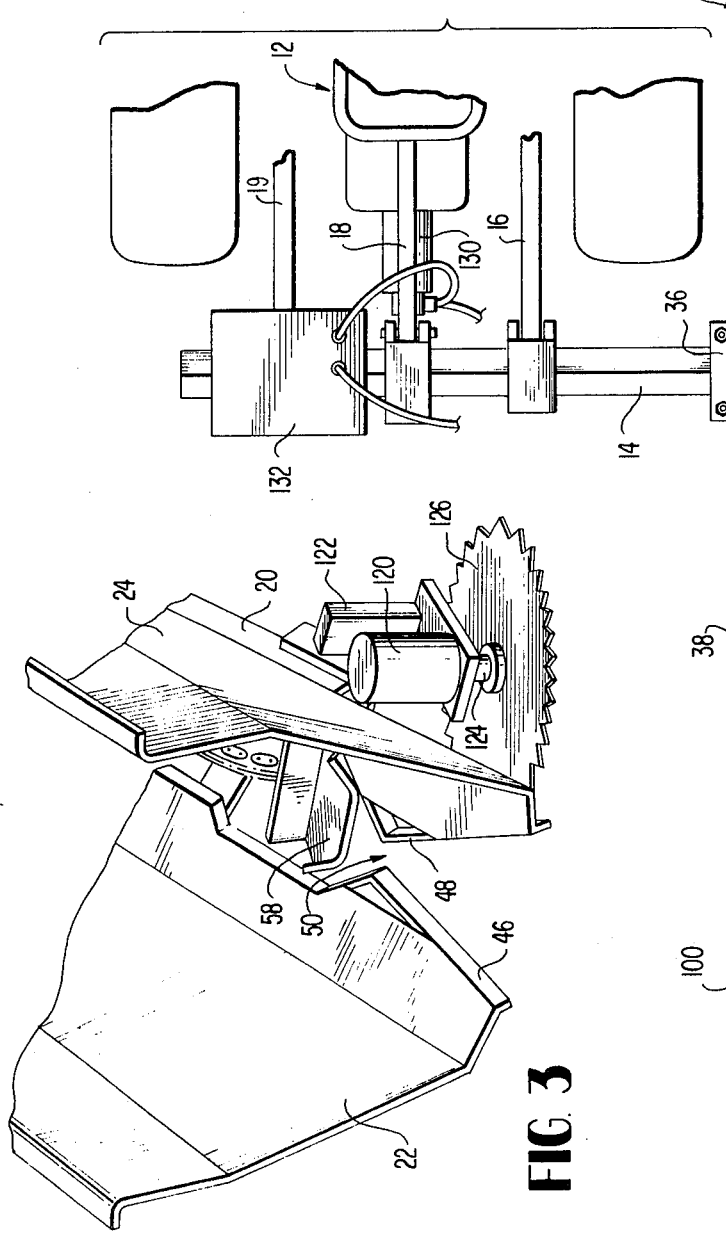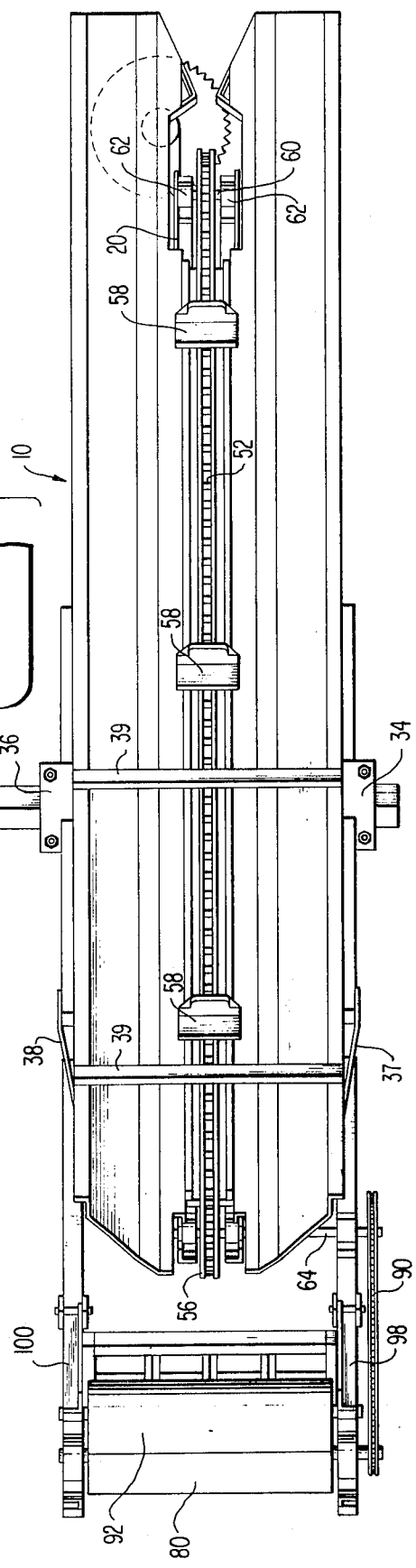

TOBACCO HARVESTER

BACKGROUND OF THE INVENTION

1. Field of the Invention

The present invention is directed to tobacco harvester and more specifically to a power driven harvester which will sever the tobacco plant and automatically strip the leaves from the stalk.

2. Prior Art

For centuries the tobacco harvesting art has been a very laborious, time consuming manual operation wherein the individual leaves are picked by hand from the plant and tied into bundles for curing.

Various attempts have been made over the years to mechanize the tobacco harvesting operation but such attempts have usually been completely unacceptable since they generally attempt to strip the leaves from the stalk while the stalk is still attached to the plant. Such methods have generally resulted in such a degree of leaf damage that the subsequent tying of the leaves for the conventional curing process was impossible. Furthermore, the damaged leaves also resulted in a reduction of the value of the crop.

Newer tobacco curing techniques have been developed in recent years wherein the leaves are cured in bulk form in a specially designed box thereby eliminating the necessity for hand tying the leaves into bundles for curing on drying racks.

SUMMARY OF THE INVENTION

The present invention provides a new and improved tobacco harvester which first severs the stalk and subsequently strips the leaves from the stalk in such a manner as to reduce leaf damage to a minimum while feeding the leaves directly into a container suitable for bulk curing of the leaves.

The present invention provides a new and improved tobacco harvester wherein the stalks are automatically cut by a saw close to the ground, fed directly into a conveyor for passage through a leaf stripping device and disposed of separately from the leaves. The leaf stripping device is so designed that the passage of the stalk, top first, through a plurality of orthogonally disposed stripping bars will result in the separation of the leaves from the stalk with a minimum amount of damage to the leaves.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is a top plan view of the harvester shown in FIG. 1 with most of the tractor eliminated.

FIG. 3 is a detailed perspective view of the lower end of the tobacco harvester.

DETAILED DESCRIPTION OF THE PREFERRED EMBODIMENTS

Figure 1:
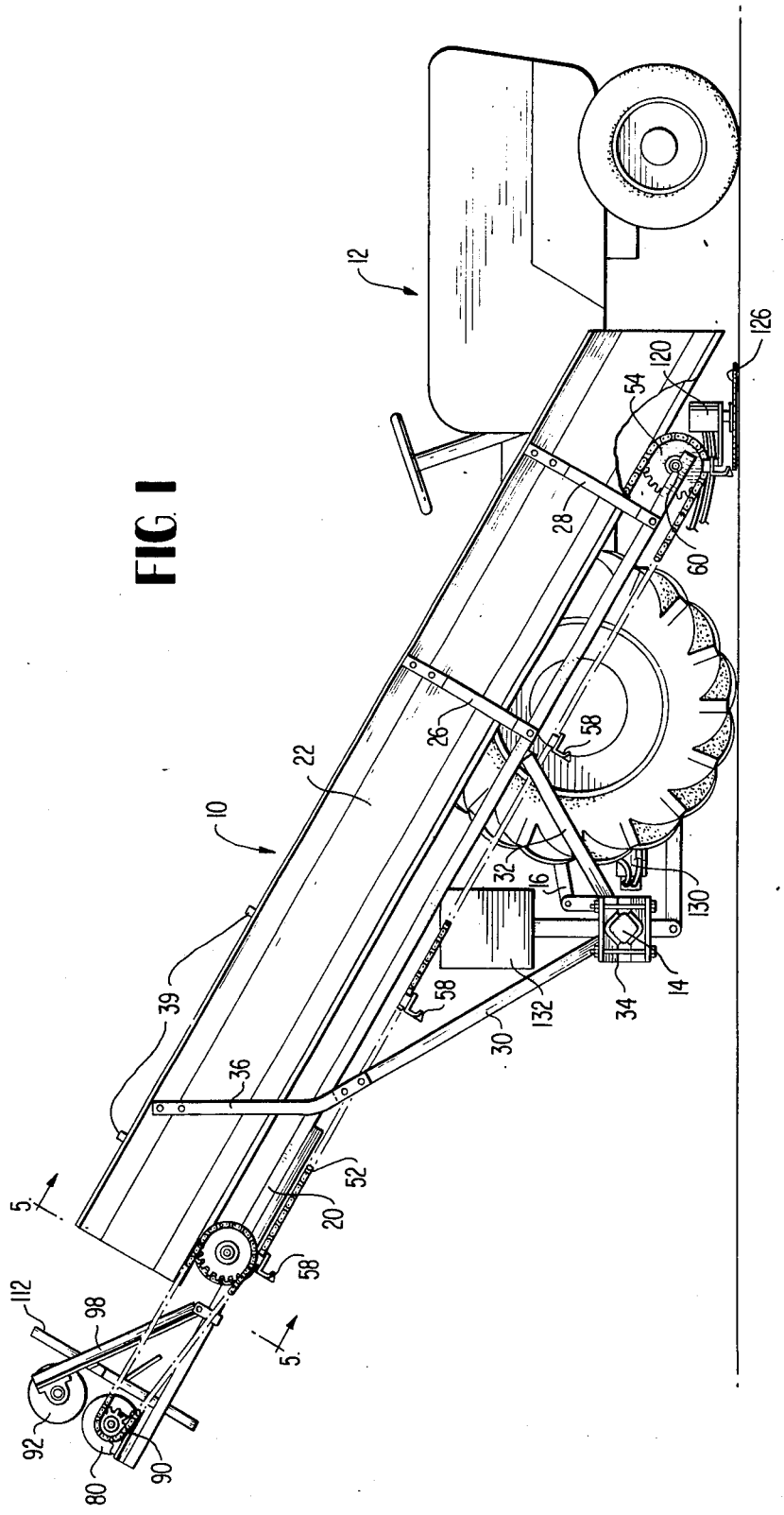
FIG. 1 is a side elevation view of the tobacco harvester according to the present invention shown mounted on a tractor in operative position.

The harvester 10 is mounted alongside the tractor 12 on a steel tool bar 14 which is clamped to and adjustably supported by a conventional three point hitch represented by the arms 16, 18 and 19 connected to the rear of the tractor 12. In this way the height of the tobacco harvester 10 can be adjusted relative to the tractor.

The tobacco harvester 10 is comprised of a rectangular open frame 20 which is constructed from a plurality of steel angle irons which are welded or connected together by any other suitable means. A pair of oppositely diverging guide walls 22 and 24 are each connected to the frame 20 by a pair of supporting arms 26 and 28. The frame 20 is in turn supported on the tool bar 14 by means of two pairs of arms 30 and 32 which are each connected at their uppermost end to a pair of transverse bars (not shown) which in turn are secured across the width of the frame 20. The lower ends of the arms 30 and 32 are connected to a pair of clamps 34 and 36 which are adjustably clamped on the tool bar 14. The uppermost ends of the guide walls 22 and 24 are supported on the arms 30 by means of extension brackets 37 and 38 connected therebetween by any suitable means such as rivets or bolts. The top edges of the side walls 22 and 24 are stabilized with respect to each other by a pair of braces 39 secured thereto and spanning the distance between the walls.

The two walls 22 and 24 define a substantially U-shaped chute with the opposed edges 42 and 44 of each wall being spaced apart to define an open slot which extends the entire length of the chute. A pair of guide flanges 46 and 48 are secured to the edges 42 and 44, respectively, adjacent the lower most end thereof and diverge outwardly toward the lower end of the chute to define a wide entrance which will gradually reduce down to a narrow opening at 50 so as to guide the tobacco stalk into the proper position for the cutting operation which will be described in detail hereinafter.

A conveyor is provided for transporting the cut tobacco plant up the chute and is comprised of an endless chain 52 which is entrained about a lower sprocket 54 and an upper sprocket 56 and which is provided with a plurality of pusher blades 58 which are secured to the chain periodically along the length thereof. The lower sprocket 54 is mounted on a shaft 60 which is journalled for rotation in a pair of bearings 62 which are mounted on the frame 20 at the lowermost end thereof. The upper sprocket 56 is mounted on a drive shaft 64 which is mounted for rotation in a pair of bearings 66 mounted on the frame 20 and an additional bearing 68 which is mounted on the stripper frame 70. The stripper frame 70 is secured by welding or the like to the underside of the frame 20 and extends rearwardly beyond the end of the chute defined by the side walls 22 and 24. Hydraulic motor 72 is mounted on a bracket 74 which in turn is mounted on the stripper frame 70 and the hydraulic motor 72 drives the shaft 64 to thereby impart movement to the conveyor chain 52.

Figure 4:
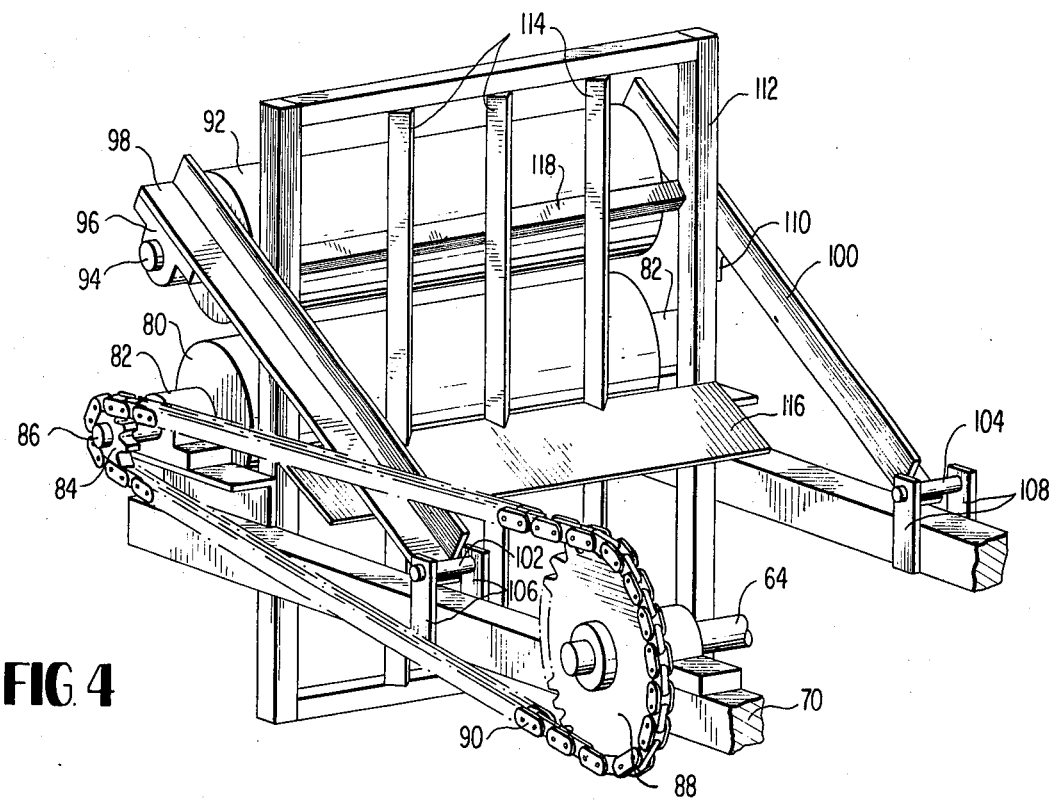
FIG. 4 is a perspective view of the tobacco leaf stripper arrangement mounted at the top of the tobacco harvester.
Figure 5:
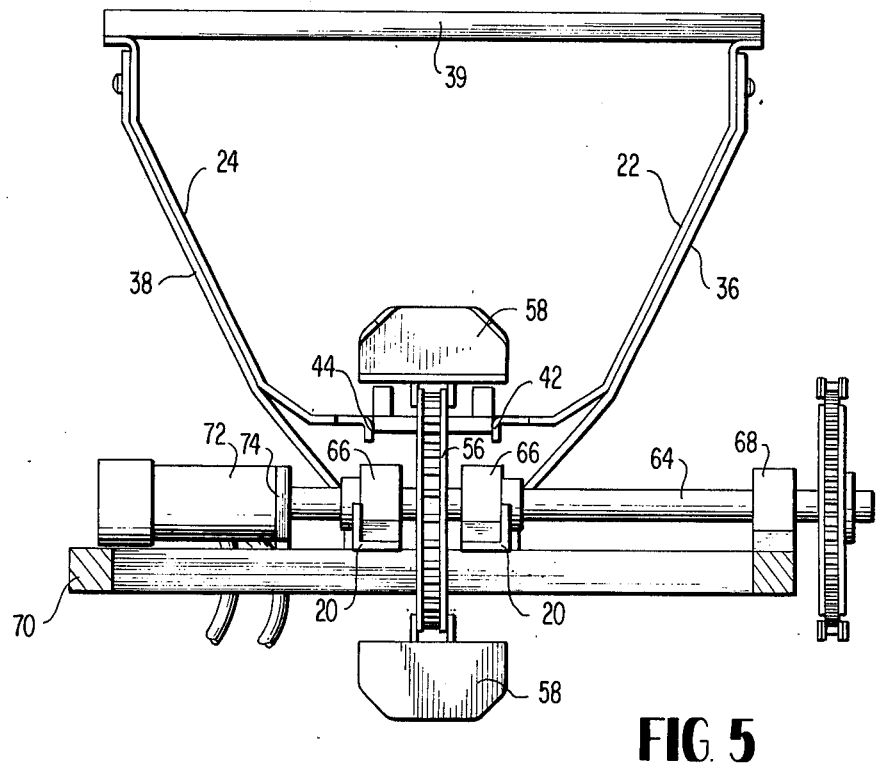
FIG. 5 is a sectional view taken along the line 5—5 in FIG. 1.

A stripping device for removing the tobacco leaves from the stalk is mounted on the stripper frame 70 and is comprised of a driven feed roller 80 which is journalled for rotation in a pair of bearings 82 which are mounted on the extreme rearward end of the stripper frame 70. A sprocket 84 is mounted on the end of the shaft 86 to which the roller 80 is connected for rotation. A larger sprocket 88 is mounted on the end of the shaft 64 outwardly of the bearing 68 and an endless drive chain 90 is entrained about the sprocket 84 and 88 so that the roller 80 will also be driven by the hydraulic motor 72. Due to the difference in sprocket size the shaft 86 upon which the roller 80 is mounted will rotate at a much faster speed than the drive shaft 64, preferably at a ratio of 2:1 or 3:1. An idle roll 92 having a shaft 94 is journalled in a pair of bearing blocks 96 which are mounted at the free ends of a pair of pivoted angle bars 98 and 100 with the axis of the shaft 94 being disposed parallel to the axis of the shaft 86. The angle bars 98 and 100 are connected to pivot pins 102 and 104 which are mounted for rotation in upstanding brackets 106 and 108 secured to the stripper frame 70. In order to maintain a minimum gap between the upper idle roller 92 and the driven feed roller 80 a pair of brackets 110, only one of which is shown in FIG. 4, are mounted on the vertically extending arms of a rectangular stripper bar support frame 112 to limit the downward pivotal movement of the angle bars 98 and 100. The minimum spacing between the rollers is necessary in order to enable the top of the tobacco stalk to enter between the rollers to be gripped thereby. As the thickness of the stalk increases the gripping force of the rollers will be increased and the stalk will be rapidly fed between the rollers at a faster rate than it was being fed up the conveyor chain 52.

A plurality of angle bars 114 are vertically mounted between the upper and lower cross-bars of the rectangular supporting frame 112 with the apex thereof extending toward the upper end of the chute defined by the side walls 22 and 24. At a location approximately level with the axis of the feed roller 80 a guide plate 116 is connected to the frame 112 and vertically disposed stripper bars 114. The guide plate 16 is angled slightly downwardly so as to deflect the upper ends of the tobacco plants as they leave the conveyor chain 52 upwardly into the nip between the rollers 92 and 80. A horizontally disposed angle bar 118 is disposed in the same horizontal plane as the shaft 94 for the roller 92 and the apex of the angle bar extends toward the upper end of the chute. Thus, four openings are defined by the frame 112, the vertical stripper bar 114, the horizontal stripper bar 118 and the horizontal guide plate 116 through which the top of the tobacco plant stalk will pass as the plant reaches the top of the conveyor. As the stalk is gripped by the rollers 80 and 92 the stalk will be quickly accelerated and the tobacco plant leaves which flare outwardly from the stalk will be stripped from the stalk by the stripper bars and guide plate which define the opening.

Figure 6:
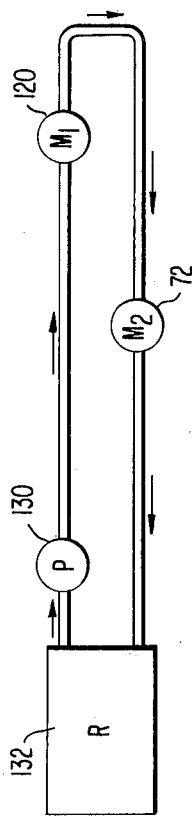
FIG. 6 is a schematic diagram showing the hydraulic circuit for the driven parts of the tobacco harvester.

At the lowermost end of the chute adjacent the lower sprocket 54 a second hydraulic motor 120 is mounted on a bracket 122 which in turn is secured to the main frame 20. The hydraulic motor 120 is provided with a drive shaft 124 which is vertically disposed and which has a circular saw blade 126 secured thereto for rotation in a horizontal plane beneath the end of the chute defined by the side walls 22 and 24. The circular saw blade 126 has a radius sufficient so as to dispose the blade directly beneath the gap 50 to sever the stalk of a tobacco plant as it is guided through the gap 50. The hydraulic motors 72 and 120, a pump 130 which is mounted on the rear of the tractor 12 and driven by the engine thereof by conventional means and the reservoir 132 which is mounted on the tool bar 14 by any suitable means are all connected in series in a single hydraulic circuit as best seen in FIG. 6. Thus, upon operation of the pump 130, which can be controlled by any conventional means on the tractor, fluid under pressure will be supplied to the hydraulic motors 70 and 120 to continuously drive the conveyor chain 52, the saw blade 126 and the driven feed roll 80.

In the operation of the tobacco harvester according to the present invention, the tractor will be driven parallel to a row of tobacco plants which are ready for harvesting. The height of the tool bar 14 may be adjusted by means of the conventional lift mechanism attached to the three point hitch 16, 18 and 20 on the rear of the tractor to adjust the height of the harvester so that the cutting blade 126 will be disposed as close as possible to the ground. As the leading end of the harvester 10 approaches a tobacco plant the stalk of the plant will be guided by the flanges 46 and 48 into the narrow gap 50 at which point the stalk will be severed by the rotating circular saw blade 126. The continued forward movement of the harvester 10 will cause the plant to fall onto the conveyor chain 52 with the uppermost end of the plant extending toward the top end of the conveyor. A pusher blade 58 secured to the conveyor chain 52 will transport the tobacco plant up the chute defined by the side walls 22 and 24.

As the plant reaches the top of the chute the top end of the stalk will pass through one of the openings in the stripper bar frame 112 and into the nip of the rollers 80 and 92. The stalk will be gripped by these rollers and since the roller 80 as is being driven at a higher rate of speed than the conveyor chain 52 the stalk will be rapidly accelerated and as the stalk is pulled through the frame 112 the leaves will be stripped from the stalk by the orthogonally disposed stripper bars 114 and 118 as well as the guide plate 116. The leaves will fall substantially vertically downwardly from the stripper frame 112 into any suitable receptable such as a box suitable for the bulk curing of tobacco so that additional handling of the individual tobacco leaves will be unnecessary. Such a tobacco curing box could be mounted on a trailer being towed by the tractor or on the bed of a separate vehicle which is moving along behind the tractor. The tobacco stalks which are stripped of the leaves will be propelled outwardly behind the end of the tobacco harvester where they can either be collected in a separate receptacle or else be allowed to fall on the ground to be plowed under.

While the invention has been particularly shown and described with reference to a preferred embodiment thereof it will be understood by those in the art that various changes in form and details may be made therein without departing from the spirit and scope of the invention.

What is claimed is:

1. A tobacco harvester adapted to be mounted on a tractor comprising a frame means, inclined chute means mounted on said frame means with the lower end of said chute means disposed close to the ground, cutting means mounted on said frame means adjacent the lower end of said chute means for serving the stalk of a tobacco plant, conveyor means on said frame means for moving the cut plant up said chute means, stripping means mounted on said frame adjacent the upper end of said chute means for removing the tobacco leaves from the stalk of the cut plant and feed means mounted on said frame for pulling the stalk through said stripping means.

2. A tobacco harvester as set forth in claim 1 further comprising guide means formed in the center lower end of said chute to properly locate the stalk of a tobacco plant for cutting by said cutting means so that the cut plant will fall within the chute means with the top of the plant directed up the inclined chute means due to the movement of the harvester.

3. A tobacco harvester as set forth in claim 2 wherein said cutting means is comprised of a circular horizontally disposed cutting disc rotatably mounted on said frame beneath said guide means for severing the stalk of a tobacco plant after the stalk has entered said guide means and drive means for rotating said cutting disc.

4. A tobacco harvester as set forth in claim 1 wherein said conveyor means is comprised of an endless conveyor member mounted for movement on said frame means with a portion thereof extending in the bottom of said chute means along substantially the entire length thereof, pusher means on said conveyor member for pushing a cut tobacco plant up said inclined chute means mounted on said frame and drive means for moving said conveyor member.

5. A tobacco harvester as set forth in claim 4 wherein said feed means comprises first roller means mounted on said frame means with the axis thereof disposed transversely with respect to the length of the chute means and spaced beyond the upper end of said chute means, transmission means on said frame for rotating said first roller means from said drive means, second roller means disposed above and parallel to said first roller means, means for pivotably mounting said second roller means on said frame for movement toward and away from said first roller means and stop means on said frame for engaging said second roller means to maintain a minimum gap between said first and second roller means into which the top of the stalk of a tobacco plant may enter for subsequent gripping by said rollers to continue the upward movement of the tobacco plant as the plant leaves said chute means.

6. A tobacco harvester as set forth in claim 5 wherein said stripping means is comprised of a plurality of orthogonally disposed bars mounted on said frame means intermediate said first and second roller means and the upper end of said chute means to define a grid of rectangular apertures through which the stalk of a cut plant will pass while the leaves of the plant are removed from the stalk by said bars.

7. A tobacco harvester as set forth in claim 1 wherein a first hydraulic motor is operatively connected to said cutting means and a second hydraulic motor is operatively connected to said conveyor means; said first and second hydraulic motors being fluidly connected in series in a hydraulic circuit to be connected to a hydraulic pump on a tractor.

* * * * *